United States Patent [19]

Liu

[11] Patent Number: 5,039,201
[45] Date of Patent: Aug. 13, 1991

[54] DOUBLE-PASS TUNABLE FABRY-PEROT OPTICAL FILTER

[75] Inventor: Karen Liu, Montclair, N.J.

[73] Assignee: International Business Machines Corporation, Armonk, N.Y.

[21] Appl. No.: 516,893

[22] Filed: Apr. 30, 1990

[51] Int. Cl.$^5$ ............................ G02B 5/28; G01B 9/02
[52] U.S. Cl. .................................. 359/589; 359/885; 356/352
[58] Field of Search ............... 356/352; 350/166, 311, 350/312, 316, 317, 347 V, 355; 372/97, 99

[56] References Cited

U.S. PATENT DOCUMENTS

| | | | |
|---|---|---|---|
| 3,471,800 | 10/1969 | Congleton et al. | 372/99 |
| 4,269,481 | 5/1981 | Yeh et al. | 350/356 |
| 4,377,324 | 3/1983 | Durand et al. | 356/352 |
| 4,466,699 | 8/1984 | Droessler et al. | 356/352 |
| 4,553,816 | 11/1985 | Durand et al. | 356/352 |
| 4,896,948 | 1/1990 | Dono et al. | 356/352 |

Primary Examiner—Ian J. Lobo
Attorney, Agent, or Firm—Douglas W. Cameron

[57] ABSTRACT

This invention describes a double-pass optical filter having a pair of reflective surfaces with a pair of optical media of different indices of refraction inserted between the surfaces. Light is then passed through the surfaces and through each of the optical media to obtain selected frequencies. This invention also includes a means for varying the distance between the reflective surfaces so as to tune the filer over a continuous range of frequencies. The continuous simultaneous turning of two resonant can be achieved by merely displacing one reflective surface relative to another.

8 Claims, 2 Drawing Sheets

DOUBLE-PASS TUNABLE FABRY-PEROT OPTICAL FILTER

DESCRIPTION

1. Technical Field

This invention relates to a double-pass optical filter. More specifically, this invention describes an apparatus having different optical media inserted between reflective plates and directing light through each of the optical media so as to obtain selected frequencies. This invention also includes a means of varying the resonant frequency of the filter by displacing only two surfaces with respect to one another.

2. Description of the Prior Art

Tunable narrowband optical filters are a basic component in numerous optical systems where the light needs to be spectrally filtered or the wavelength of the light needs to be measured. As a basic component, there are other applications as well. One of the most common forms of tunable optical filters is a Fabry-Perot resonator, which consists of a pair of parallel mirrors whose spacing is varied to tune the passband. (Ref. 1). The passband exists because the light is reflected by the mirrors and bounces back and forth in the optical cavity. At each pass and at each mirror, a small fraction of the light power is transmitted through the mirror (which is not totally reflecting). Interference occurs between all the passes of light out the front and all the passes of light out the back of the cavity. The phase shift of the light as it makes a roundtrip through the cavity depends on the wavelength, and it determines to what degree the interference is constructive or destructive. By energy conservation, if the interference is constructive out the back, it must be destructive from the front of the cavity. For another wavelength, the interference will be constructive for light from the front and destructive for light out the back, and the cavity will reflect or reject the light. Intermediate wavelenghts have some rejection and some transmission. It should be noted that the parallel mirrors need not be planar; in fact, it is often desirable to use concave mirrors to minimize diffraction loss and/or increase the stability of the cavity.

The condition for maximum transmission is that the cavity optical length be an integral multiple of $\lambda/2$. So for cavity length greater than a wavelength, there are a number of wavelengths which satisfy this condition. A parameter known as the FSR (free spectral range), defined as the wavelength separation between maxima in the transmission function, is determined by the cavity optical length. The sharpness of each transmission peak as a function of wavelength (commonly measured as the full-width at half maximum intensity) is determined by the reflectivity (and loss) of the interferometer plates as well as the plate spacing. The figure of merit known as finesse (F) defined as F=FSR/fwhm, is directly a measure of the selectivity of the filter. In practice, the finesse is limited by the reflectivity, alignment and general optical quality of the interferometer plates.

Turning of the filter is done by changing the optical path length of the cavity. The optical path length is the physical path length multiplied by the index of refraction of the medium through which the light passes within the cavity. In many cases, tuning is done by changing the physical spacing between mirrors by means of piezoelectic pushers or some other mechanical method. It is also possible to use an electro-optic material within the cavity whose index can be modified to tune the cavity.

One conventional way of fabricating a simple piezoelectrically tuned Fabry-Perot filter is shown in FIG. 1. The two mirror surfaces 1 are reflective coatings (usually dielectric multi-layer thin films) deposited coatings on two glass substrates 2. Piezoelectric pieces 3 of PZT (lead zirconite-titanate) or other material connects the two substrates and controls the mirror spacing. A voltage applied through electrodes (not shown) on the piezoelectric material causes the cavity spacing to change. By using three or 4 separate piezoelectric stretchers, the high degree of paralleslism needed between the mirrors can also be obtained. The mirror spacing is typically 1-1000 microns for wavelengths on the order of 1 micron. The required length of piezoelectric material to achieve the necessary extension is much larger, on the order of cm's, necessitating the "top-hat" shape shown. The light to be filtered passes approximately perpendicularly to the surface of the mirrors.

Since it is not always easy or even possible to get the desired finesses from a single F-P filter, it is common practice to cascade two or more into a compound filter. With suitable optical isolation between the individual filters, the transmission function of the compound filter is the product of the transmission functions of the individual ones. (Otherwise, there are coupling effects which greatly complicate the behavior.)

Cascaded filters can either have equal cavity lengths or unequal cavity lengths. In general, unequal cavity lengths are desirable because higher levels of transmission occur only for wavelengths that satisfy the phase relationship for both cavities (the Vernier effect), (Ref. 2) Thus, for the same mirror reflectivities, the finesse is increased by increasing the FSR. However, such a complex filter requires that both cavities be controlled together (Ref. 3). The control of one cavity depends on knowing the setting of the other precisely. For operational simplicity, equal cavities are often used since they can be formed by multiple passes through the same set of mirror plates. In this case the increase in finesse results from a narrowing of the transmission peak without increase in FSR.

The prior art includes the use of gases within the optical cavity to modify the effective optical cavity length (Ref. 3). The prior art uses changes in pressure to scan or re-tune the filter. In Reference 3, the index of refraction is varied to tune the filter. The tuning control of a filter with dissimilar cavity lengths is difficult. In order to sweep the filter continuously, both cavities must be coordinated. In the case of a simple F-P, the transmission wavelength is $\lambda_t = 2L/N$ where L is the cavity length and N is an integer. We see that $\lambda_t$ and L are proportional. For two cascaded cavities of lengths $L_1$ and $L_2$, the passband is at $\lambda_t = 2L_1/N = 2L_2/M$.

If $L_1$ were to be changed without changing $L_2$, the transmitted wavelength would jump to some other value corresponding to another pair of integers N' and M'. It is not simple to predict what this wavelength would be since in general N and M may be very large and not known accurately.

U.S. Pat. application Ser. No. 312,284, filed 02/20/89 assigned to the same assignee as the current invention, describes a tuning technique that allows $L_1$ and $L_2$ to be varied in such a way that their ratio stays constant, thereby allowing for continuous tuning.

1. G. Hernandez, *Fabry-Perot Interferometers*, Cambridge University Press, 1986

2. G. Picchi, "Multi-cavity vs. multipass Fabry-Perot filters for channel selectrion in optical WDMA networks," Electron. Letts., 25, (1989)

3. J. E. Mack, D. P McNutt, F. L. Roesler and R. Chabbal, "The PEPSIOS purely interferometric high-resolution scanning spectrometer," Appl. Optics, 2, 873–885 (1963)

4. *American Institute of Physics Handbook*, 3rd ed., Dwight E. Gray, ed., McGraw-Hill Book Co., 1982

SUMMARY OF THE INVENTION

It is an object of this invention to provide a double-pass filter that can be tuned by displacing only two reflective surfaces relative to one another.

It is an object of this invention to provide a double-pass optical filter with a minimum number of reflective plates. Such minimum number reduces the difficulty in aligning the reflective plates to a high degree of parallelism, and in controlling the surface finish and coating reflectivities.

Accordingly, this invention provides a means for resonating light which has a pair of optical media with one of the media having a different index of refraction than the other media of the pair. This invention also provides a means for directing a light beam into the first media, out of the resonating means and into the second media so as to obtain a particular frequency from the light.

More specifically, this invention provides for an optical filter having a pair of reflective surfaces with two optical media inserted between the reflective surfaces to form two resonating cavities. Each of the optical media has an index of refraction which is distinct from the index of refraction of the other of the optical media, and each cavity has a distinct one of the optical media therein. A light beam is then directed through at least one of the surfaces and through both of the cavities so as to obtain a particular frequency from the light beam, where the particular frequency is a common resonant frequency of both of the cavities.

In addition, this invention provides a means for varying at least one dimension of a resonating means so as to continuously vary the frequency obtained from the light beam. A more specific version of this invention provides for varying the frequency obtained from the filter by merely displacing two surfaces relative to one another.

DESCRIPTION OF THE PREFERRED EMBODIMENT

Figure 1:
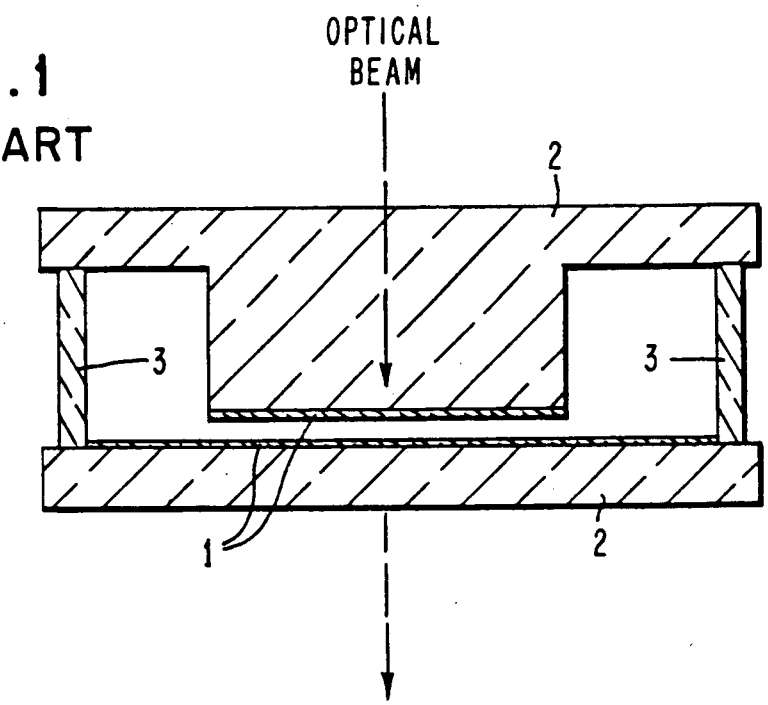
FIG. 1 is a schematic illustration of a simple conventional piezoelectric Fabray-Perot filter.
Figure 2:
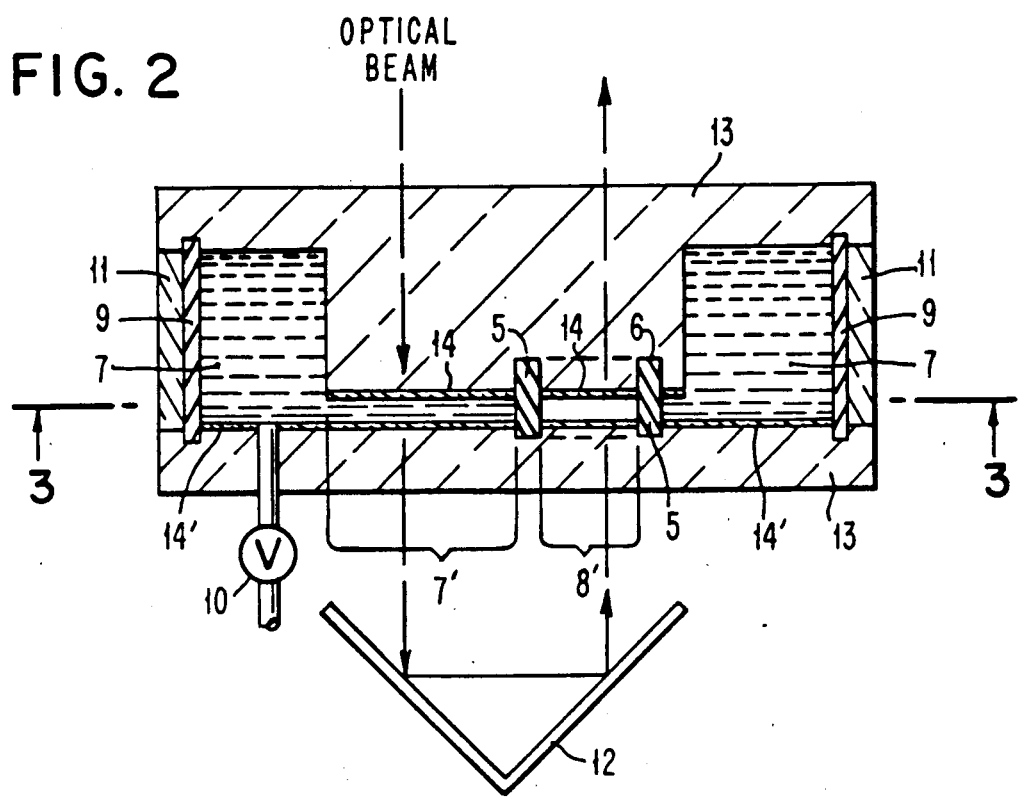
FIG. 2 is a schematic illustration of the optical filter of this invention.

The present invention takes advantage of the notion that the double-pass configuration automatically causes the two cavities to be physically linked. However, it is necessary to make the two cavities unequal in optical path length in order to get the large increase in free spectral range desired for high finesse. One way of achieving this is by introducing dissimilar optical media into the two cavities, or halves of the FPI as shown in FIG. 2. Now $$\lambda_t = 2Ln_1/N = 2Ln_2/M$$

and $\lambda_t$, and L are again directly proportional. It is also necessary that the optical media fill the cavities, or that the length of the optical media in each cavity be proportional to the length of the cavity even as the length of each cavity is varied.

An O-ring 5 is held in a slot 6 cut into the glass mirror substrates 13. A fluid 7 is injected into the portion outside the O-ring with air or vacuum 8 remaining in the portion inside the O-ring 5. The preferred embodiment requires that a fluid seal 9 be made in the outer portion of the device by modifying the mounting of the piezoelectric cylinder. In the particular case that the fluid is a gas, the design allows the index of the gas to be adjusted during manufacture though variations of the pressure by injection through a valve 10. In the case of a compressible fluid or gas, the small volume of the cavity 8' and the comparatively much larger volume of the cavity 7' containing fluid 7 allows a sufficient reservoir of fluid, such that the pressure and thus the index do not change significantly when the cavity 8' is tuned. Alternatively, the entire filter could be placed in a separate gas-filled chamber. Also shown are mirrored surfaces 14 and 14' of cavities 7' and 8'. A light or optical beam is then directed by mirror 12. Also shown are piezoelectric pushers 11 which are used to displace mirrored surfaces 14 and 14' relative to each other. FIG. 2 also shows the light or optical beam passing through a reflective surface 14', onto the surfaces of mirror 12, back through reflective surface 14', into optical media 8, and finally again through reflective surface 14, through which the selected frequency is obtained.

Figure 3:
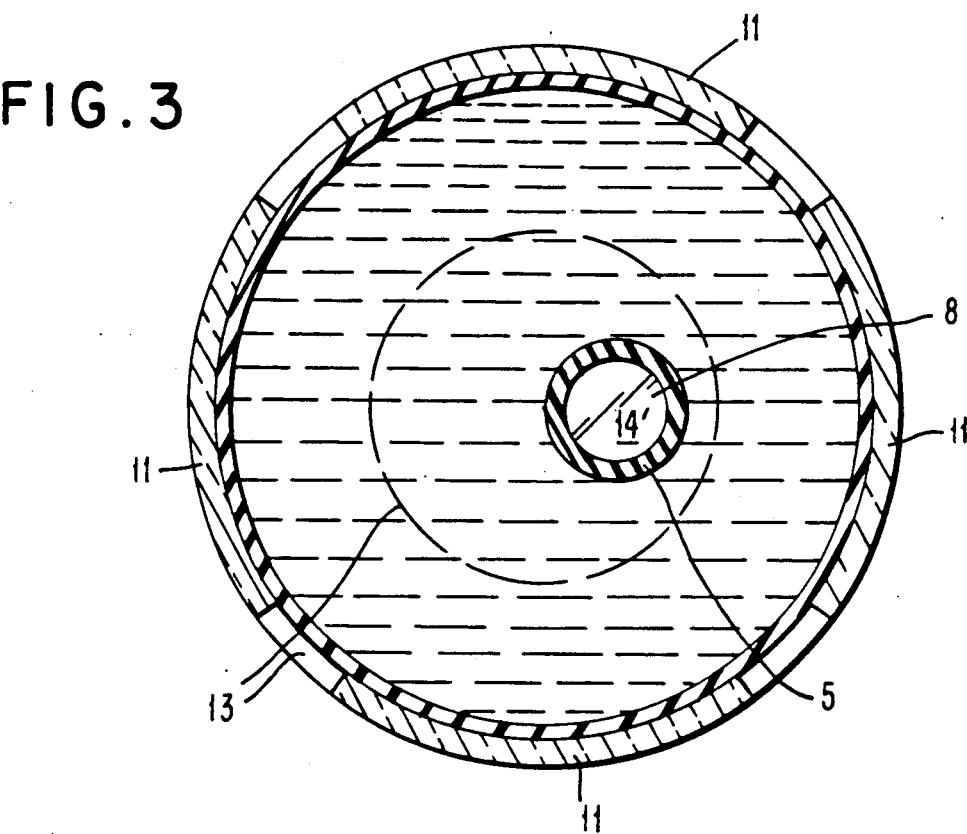
FIG. 3 is a sectional plan view of the cavities of the optical filter of FIG. 2.

FIG. 3 (not to scale) shows a sectional plan view of the cavities in the direction shown by the arrows 3 of FIG. 2.

It is also possible to use liquids or even slightly compressible solids as the total range of cavity motion is usually only on the order of a micron. However, some other means of adjusting the index, such as temperature tuning, is required so that the index allows a desired passband to exist.

Figure 4:
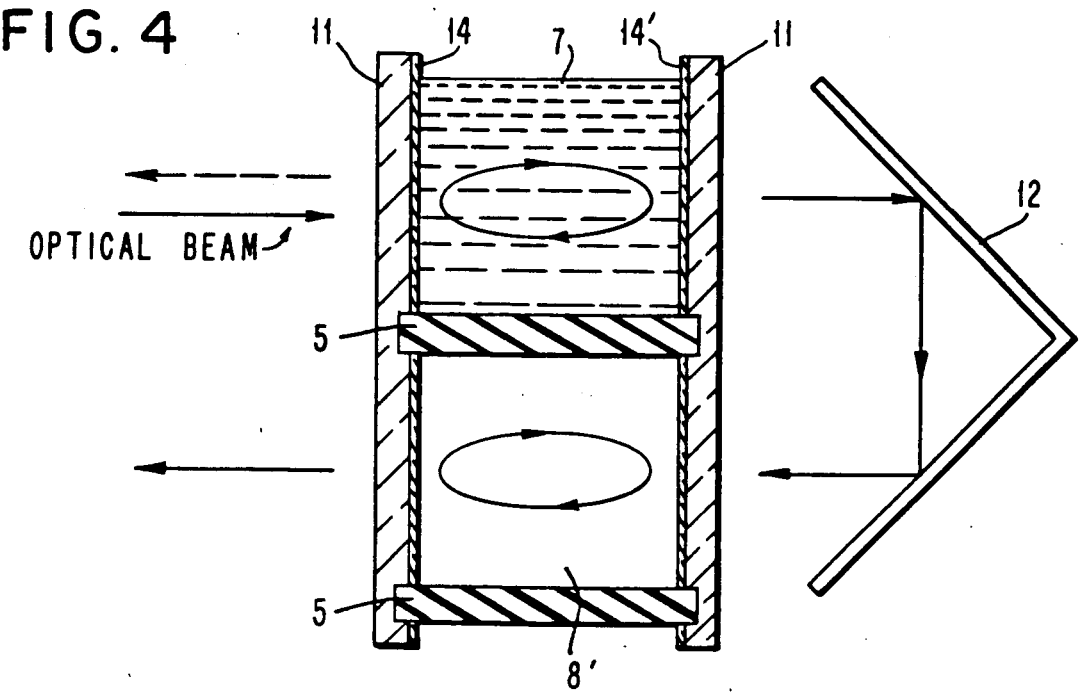
FIG. 4 is an enlarged version of the cavities and the means for directing the light through each of the cavities.

In the case of an incompressible fluid or liquid, the fluid could be placed within the O-ring since pressure adjustment is not necessary. The elasticity of the O-ring itself should allow the volume of the fluid to remain constant as the cavity 8' is tuned since the required motion of the plates is only a few optical wavelengths or less (microns) in most applications. A design example is described below to give one set of possible materials and dimensions that could be used. Consider a cavity whose physical length is 200 $\mu$m for use with visible light with a wavelength of 0.5 $\mu$m. Then, the requirement for the two cavities is:

$$\lambda/2 = n_1 L/N = n_2 L/M$$

where N and M are integers, $n_1 \wedge n_2$ are the indices of refraction of the material in the first and second cavities respectively, and L is the distance between the mirror surfaces on opposite sides of the cavities. See FIG. 4, which is an expanded view of a portion of FIG. 2, showing the two cavities 7' and 8'. Letting $n_1 \approx 1$, N=400. The smallest index $n_2$ that will work corresponds to M=401. For this case, $n_2 = 1.0025$. 1.5 atmospheres of benzene vapor or 2.9 atmospheres of ethanol vapor (at 0° C.) can give the desired index (Ref. 4). The numbers used in this example are for 0° only because these are given in Ref. 4; this does not reflect a preferred operating temperature. There is no reason the etalon cannot operate at room temperature or higher. If gas vapors are not desirable for the application, air at 10 atmospheres gives the same result. If first cavity 8' contains air rather than vacuum, the index of the air must be considered. One atmosphere of air at 0° C. has an index of 1.000293 at a wavelength of 0.5 μm. Since $n_{air}$ is an order of magnitude less than the index difference needed between the two cavities, the difference can easily be compensated for by a small adjustment in the pressure of the gas in the second cavity 7'. Tuning the cavity spacing by 1 μm out of 200 μm (in height) changes the pressure in the first part of the cavity by 0.5%. This scaling is independent of the lateral dimensions of the etalon. The index of an ideal gas varies with pressure as $(n-1)=(n_0)P$. The new index in the first cavity is 1.000294, and the passband of that part is shifted by only $1\times 10^{-6}$ μm. The FSR of this part of the etalon is $1.8\times 10^{-3}$ μm, so the loss in throughput is small even for a finesse of several hundred. The pressure change in the second cavity is even smaller because of the large reservoir volume. The height of the reservoir is typically 1 cm, so the pressure change for a 1 μm change is only 0.01%.

The indices in the two cavities can change with temperature also. The change of index with temperature of an individual gas is small, on the order of $10^{-6}/°$ C., so this effect is of the same order as the pressure index change due to tuning described above. In addition, temperature control of Fabry-Perot elatons is often used in conventional practice; this embodiment does not increase the temperature control requirement.

Having thus described my invention, what I claim as new and desire to secure by Letters Patents is:

1. An optical filter, comprising:
   a pair of reflective surfaces;
   a pair of optical media with a first media of said pair of media having a different index of refraction than a second media of said pair of media, said pair of optical media inserted between said surfaces to form two resonating cavities with the first media being of a different material than the material of said second media; and
   means for directing a light beam through at least one of said surfaces and through both of said cavities so as to obtain a particular frequency of said light beam, said particular frequency being a common resonant frequency of both of said cavities.

2. An optical filter, comprising:
   a pair of reflective surfaces with one of said surfaces being parallel to the other of said surfaces;
   a pair of optical media with a first media of said pair of media having a different index of refraction than a second media of said pair of media, said pair of media inserted between said surfaces to form two resonating cavities with the first media being of a different material than the material of said second media;
   means for directing a light beam in a first direction orthogonal to and through both said surfaces while passing through one of said cavities and also in a second direction orthogonal to and through both said surfaces while passing through another of said cavities so as to obtain a particular frequency, said second direction being parallel and opposite to said first direction, said frequency being a common resonant frequency of both of said cavities.

3. An optical filter, comprising:
   a pair of reflective surfaces;
   a pair of optical media with a first media of said pair of media having a different index of refraction than a second media of said pair of media, said pair of optical media inserted between said surfaces to form two resonating cavities with the first media being of a different material than the material of said second media;
   means for directing a light beam through at least one of said surfaces and then through both of said cavities so as to obtain a particular frequency of said light beam, said particular frequency being a common resonant frequency of both of said cavities; and
   means for varying the distance between said surfaces so as to continuously and simultaneously vary the resonant frequency of both of said cavities so as to continuously vary said particular frequency obtained from said light beam.

4. An apparatus as recited in claim 3, wherein said apparatus has at most two reflective surfaces.

5. An apparatus as recited in claim 3, wherein said means for varying the distance between said surfaces comprises a pair of piezoelectric pushers inserted between said pair of said surfaces with said distance varying in response to voltages applied to said pushers.

6. An optical filter, comprising:
   a pair of reflective surfaces with one of said surfaces being parallel to the other of said surfaces;
   a pair of optical media with a first media of said pair of media having a different index of refraction than a second media of said pair of media, said pair of media inserted between said surfaces to form two resonating cavities with the first media being of a different material than the material of said second media;
   means for directing a light beam in a first direction orthogonal to and through both said surfaces while passing through one of said cavities and also in a second direction orthogonal to and through both said surfaces while passing through another of said cavities so as to obtain a particular frequency, said second direction being parallel to and opposite to said first direction, said frequency being a common resonant frequency of both of said cavities; and
   means for varying the distance between said surfaces so as to continuously and simultaneously vary the resonant frequency of both of said cavities so as to continuously vary said particular frequency obtained from said light beam.

7. An apparatus as recited in claim 6, wherein said means for varying the distance between said surfaces comprises a pair of piezoelectric pushers inserted between said pair of said surfaces with said distance varying in response to voltages applied to said pushers.

8. An apparatus as recited in claim 6 wherein said apparatus has at most two reflective surfaces.

* * * * *